US012544281B2

(12) United States Patent
Kosiorek et al.

(10) Patent No.: US 12,544,281 B2
(45) Date of Patent: Feb. 10, 2026

(54) SECTIONAL LITTER

(71) Applicant: ALPHAPOINTE, Kansas City, MO (US)

(72) Inventors: Christopher Bryan Kosiorek, La Vernia, TX (US); Ryan Williams, Olathe, KS (US)

(73) Assignee: ALPHAPOINTE, Kansas City, MO (US)

( * ) Notice: Subject to any disclaimer, the term of this patent is extended or adjusted under 35 U.S.C. 154(b) by 14 days.

(21) Appl. No.: 18/645,073

(22) Filed: Apr. 24, 2024

(65) Prior Publication Data

US 2024/0350330 A1 Oct. 24, 2024

Related U.S. Application Data

(60) Provisional application No. 63/461,515, filed on Apr. 24, 2023.

(51) Int. Cl.

| | |
|---|---|
| ***A61G 1/013*** | (2006.01) |
| ***A61G 1/044*** | (2006.01) |
| ***A61G 1/048*** | (2006.01) |
| *A61G 1/04* | (2006.01) |

(52) U.S. Cl.

CPC ............. *A61G 1/013* (2013.01); *A61G 1/044* (2013.01); *A61G 1/048* (2013.01); *A61G 1/04* (2013.01)

(58) Field of Classification Search

CPC ........ A61G 1/013; A61G 1/044; A61G 1/048; A61G 1/04

USPC ............................................ 5/625, 627, 628

See application file for complete search history.

(56) References Cited

U.S. PATENT DOCUMENTS

| | | | | |
|---|---|---|---|---|
| 261,796 A * | 7/1882 | Wells | A61G 1/013 | 5/120 |
| 722,456 A * | 3/1903 | Reeves | A61G 1/013 | 5/628 |
| 1,371,830 A * | 3/1921 | Wise | A47C 17/80 | 5/118 |
| 2,228,012 A * | 1/1941 | MacKenzie | A61G 1/00 | 5/627 |
| 2,279,694 A * | 4/1942 | Martinson | A61G 1/01 | 5/628 |
| 2,309,464 A * | 1/1943 | Lucci et al. | A61G 1/01 | 5/628 |
| 2,350,573 A * | 6/1944 | Smith, Jr. et al. | A61G 1/01 | 5/628 |
| 2,489,828 A * | 11/1949 | Springer | A61G 1/01 | 5/628 |

(Continued)

*Primary Examiner* — Robert G Santos

(74) *Attorney, Agent, or Firm* — Kutak Rock LLP; Brian L. Main

(57) ABSTRACT

A sectional litter is provided. The litter includes a plurality of plate sections, at least some of which are configured to secure directly to a patient. Each plate section includes a plate, and each plate overlaps at least one other plate, thereby forming a main body that can be dragged along the ground or carried above the ground, depending on a user's preference. The litter includes a plurality of straps, including lateral straps for maintaining spacing of the plates when dragging the litter, lateral straps for securing the litter to a patient, and handle straps for lifting a patient when dragging the patient is infeasible or undesirable. The plates define a plurality of lifting apertures for securing adjacent plates to each other when lifting, thereby forming a semi-rigid main body.

20 Claims, 13 Drawing Sheets

(56) References Cited

U.S. PATENT DOCUMENTS

| | | | | | |
|---|---|---|---|---|---|
| 2,614,266 | A * | 10/1952 | Smith | A61G 1/003 | 5/236.1 |
| 2,788,530 | A * | 4/1957 | Ferguson | A61G 1/01 | 5/628 |
| 3,158,875 | A * | 12/1964 | Fletcher | A61G 1/01 | 5/628 |
| 4,216,556 | A * | 8/1980 | Haeussinger | A61G 1/013 | 5/628 |
| 4,627,428 | A * | 12/1986 | Brooks | B60R 22/105 | 5/625 |
| 4,922,562 | A * | 5/1990 | Allred | A61G 1/013 | 5/628 |
| 5,577,281 | A * | 11/1996 | Mital | A61G 7/103 | 5/81.1 T |
| 5,701,619 | A * | 12/1997 | Ullman | A61G 1/01 | 5/628 |
| 5,720,303 | A * | 2/1998 | Richardson | A61G 1/01 | 128/870 |
| 5,729,850 | A * | 3/1998 | Eskeli | A61G 1/01 | 5/628 |
| 6,668,397 | B2 * | 12/2003 | Olenick | B62D 33/06 | 5/118 |
| 6,711,762 | B2 * | 3/2004 | Olenick | A47C 17/64 | 5/118 |
| 9,757,286 | B2 * | 9/2017 | Beaulieu | A61G 1/044 | |
| 2003/0140415 | A1 * | 7/2003 | Olenick | B62D 33/0612 | 5/118 |
| 2003/0140416 | A1 * | 7/2003 | Olenick | B62D 33/06 | 5/118 |
| 2015/0143634 | A1 * | 5/2015 | Beaulieu | A61G 1/044 | 5/628 |
| 2024/0350330 | A1 * | 10/2024 | Kosiorek | A61G 1/013 | |

* cited by examiner

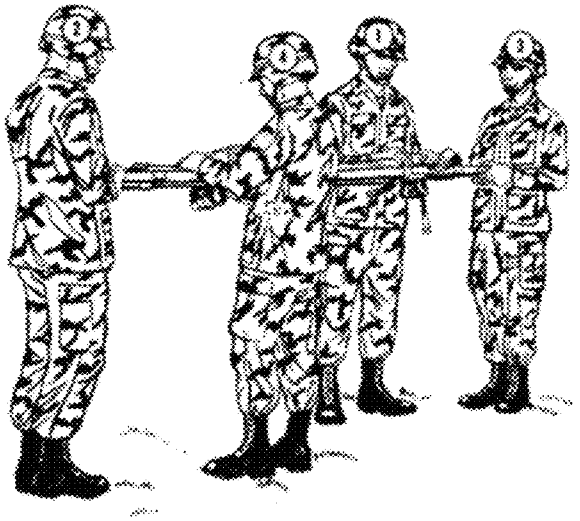
*Figure 1-5. Opening litter (step one).*
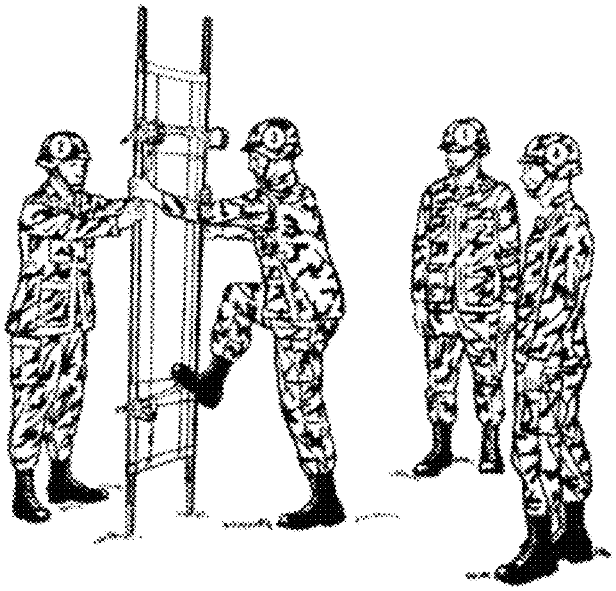
*Figure 1-6. Opening litter (step two).*
Fig. 1A-3 (Prior Art)

SECTIONAL LITTER

CROSS-REFERENCE TO RELATED APPLICATIONS

This application claims priority pursuant to 35 U.S.C. 119 (e) to U.S. Provisional Patent Application Ser. No. 63/461,515, filed Apr. 24, 2023, the entire disclosure of which is incorporated herein by reference.

FIELD OF THE INVENTION

The present invention relates generally to medical litters. More specifically, the present invention is concerned with a sectional litter that can be quickly and easily moved from a stowable configuration to a deployed configuration by moving a plurality of plates relative to each other.

BACKGROUND

The litter is a staple for patient care to assist with transportation of a patient. Many litters are specifically designed for evacuating patients from a battlefield or other areas. For instance, the U.S. Army's Field Manual FM 8-10-6 (the "Field Manual") references a standard litter (FIG. 1A-1) and a folding litter (FIG. 1A-2), each of which includes opposed poles and a fabric extending therebetween (each a "pole litter").

While presumably adequate for their intended purposes, pole litters are heavy and, even when collapsed, relatively large, sometimes making it infeasible or undesirable to carry a sufficient number of pole litters into the field, if any can be carried at all. Furthermore, deployment of pole litters can be difficult and time consuming (see FIG. 1A-3), thereby delaying evacuation of patients. Furthermore still, a pole litter requires at least two people when utilizing the litter to move a patient, thereby potentially further delaying or possibly preventing evacuation of patients. Accordingly, it would be beneficial to have a lightweight litter that is small and easy to carry, thereby making it feasible and acceptable to carry a sufficient number of litters into the field. Furthermore, it would be beneficial to have a litter that can be deployed quickly and easily, thereby expediting evacuation of patients. Furthermore still, it would be beneficial to have a litter that can be utilized by a single person, thereby expediting evacuation of patients in some situations, and enabling evacuations of patients in other situations.

Various other litters (e.g. litters of FIGS. 1B-1 thru 1B-6) have been employed with varying success in various circumstances, but each of the various other litters are either large and/or heavy, thereby hindering storage and/or transportation of such litters when not in use, or they lack sufficient versatility when in use. In either case, the benefits of having such litters when a litter is needed is often outweighed by the burden of carrying such litters when a litter is not needed. Accordingly, it would be beneficial to have a versatile litter that is light weight, easily stowable, and easily transportable when not in use so that any potential burden associated with carrying the litter is minimized and so that the benefits associated with having the litter are maximized.

SUMMARY

The present invention comprises a unique sectional litter system that is light weight and small so that it is easy to carry when not in use. The sectional litter includes a plurality of plates and a plurality of straps associated therewith. When the sectional litter is in a stowable configuration, the plates are stacked on top of each other, thereby minimizing the size of the litter so as to facilitate storage and transportation of the litter when not in use.

When needed, the sectional litter can be quickly and easily moved from a stowable configuration to a deployed configuration. In some embodiments, each plate overlaps an adjacent plate, thereby forming a chain of overlapping plates when the sectional litter is in a deployed configuration. The chain of overlapping plates provides protection and other benefits beyond the benefits associated with each plate on its own. In some such embodiments, the chain of overlapping plates is sized and shaped to fit under the torso and legs of a person, thereby providing a protective layer between the person and the ground. The bottom side of each plate is relatively smooth to facilitate sliding the sectional litter along the ground, thereby facilitating evacuation or other movement of patients without requiring multiple people to lift the litter. For instance, a front strap of the litter can be used to pull patients, thereby enabling a single person to evacuate or otherwise move a patient.

The sectional litter includes a plurality of lateral and longitudinal straps. In some embodiments, the longitudinal straps control the relative position of each plate along a length of the chain of plates, and respective longitudinal straps secure each plate to the patient. In some embodiments, the longitudinal straps are configured to curve the sides of each plate generally upwards, thereby forming a shell, a cocoon, or the like for protecting the patient. In some embodiments, the sectional litter includes a lift strap assembly, thereby facilitating carrying the sectional litter during evacuation, such as when sliding the litter is impracticable and/or undesirable. In some embodiments, the lift strap assembly is removable from the litter. In other embodiments, the lift strap assembly is integrated with the litter.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of the invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1A-1 is a perspective view of a standard collapsible litter of the prior art, the litter shown in a closed configuration and in an open configuration;

FIG. 1A-2 is a perspective view of a folding aluminum litter of the prior art, the litter shown in a closed, folded, and strapped configuration and in an open configuration;

FIG. 1A-3 shows a two-step process for moving the standard collapsible litter of FIG. 1A-1 from its closed configuration to its open configuration;

FIG. 1B-1 is a perspective view of a poleless semirigid litter of the prior art;

FIG. 1B-2 is a top view of a poleless nonrigid litter of the prior art;

FIG. 1B-3 is a stokes litter of the prior art;

FIG. 1B-4 is a SKED litter of the prior art;

FIG. 1B-5 depicts a method of the prior art using a rolled blanket as a litter; and FIG. 1B-6 shows two spine boards of the prior art, the left spine board being a short spine board that is configured to be secured to a torso only, and the right spine board being a long spine board that is configured to be secured to a torso and the legs extending from the torso.

FIG. 3A shows a disengaged handle assembly and a plurality of open lateral straps;

FIG. 3B shows each of the lateral straps in a respective closed configuration;

FIG. 3C shows the handle assembly in an engaged configuration; and

FIG. 3D shows the engaged handle assembly in a vertical orientation.

FIG. 5A shows a user holding a pull strap of the litter in one hand and a main body of the litter in another hand, the main body being in a stacked configuration associated with the stowable configuration of the litter;

FIG. 5B shows the litter immediately following the user releasing the main body, thereby allowing gravity to move the main body towards an extended configuration associated with the deployed configuration of the litter; and FIG. 5C shows the litter laying on the ground immediately following the main body being moved to its extended configuration.

FIG. 6A shows the litter in a stowable configuration;

FIG. 6B shows the litter in an intermediate configuration with a partially extended main body;

FIG. 6C shows the litter in a deployed configuration with a fully extended main body;

FIG. 6D shows the litter in a securing configuration; and

FIG. 6E shows the securing configuration of the litter from a different angle.

FIG. 7A shows the litter in a stowable configuration with a fully stacked main body, each plate of the main body being in a respective retracted configuration;

FIG. 7B shows the litter in an intermediate configuration with a partially extended main body, plates of the extended portion of the main body being in respective expanded configurations, and plates of the stacked portion of the main body being in respective retracted configurations; and FIG. 7C shows the litter in a deployed configuration with a fully extended main body, each plate of the main body being in a respective extended configuration.

FIGS. 8A thru 8C show the litter in a stowable configuration, and FIGS. 8D and 8E show the litter in a deployed configuration.

DETAILED DESCRIPTION (OPTIONAL)

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 1A:
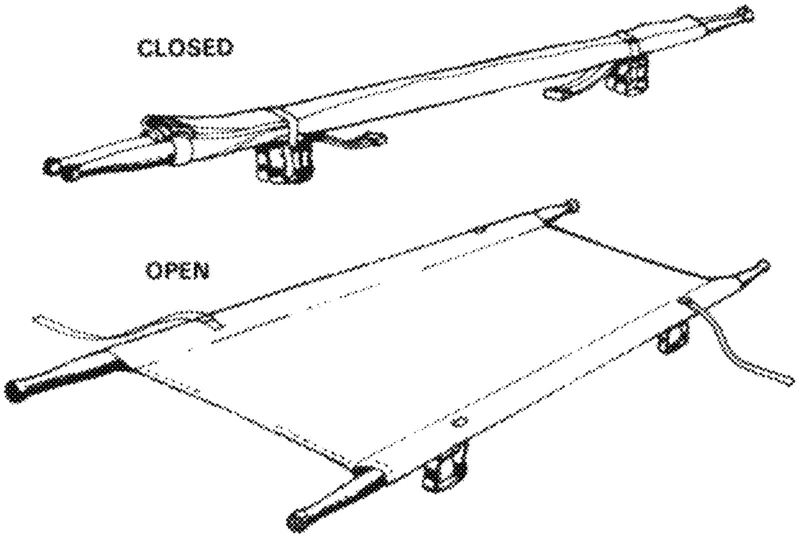
Fig. 1A-1 (Prior Art)
FIGS. 1A-1 thru 1A-3 and FIGS. 1B-1 thru 1B-6 are images taken from the Field Manual, which is available at https://www.globalsecurity.org/military/library/policy/arty/Im/8-10-6/fm8-10-6-2000.pdf. More specifically.
Figures 1, 1A, 2:
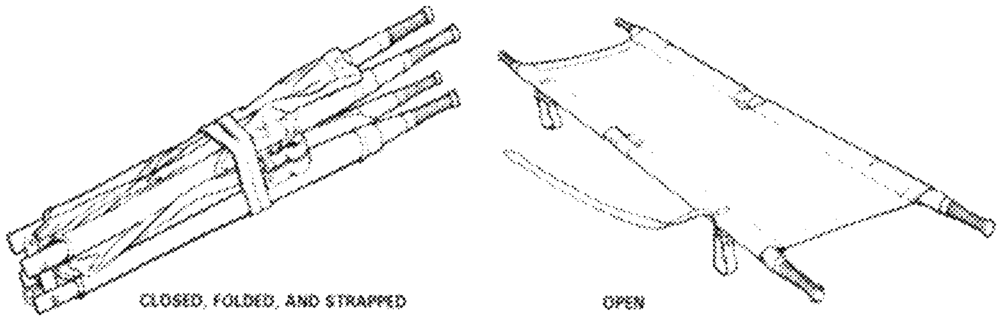
Fig. 1A-2 (Prior Art)
Figures 1, 1B:
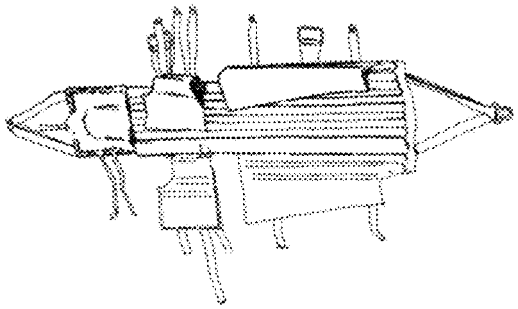
Fig. 1B-1 (Prior Art)
Figures 1, 1B, 2:
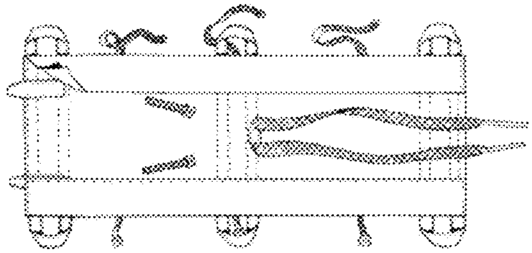
Fig. 1B-2 (Prior Art)
Figures 1, 1B, 2, 3:
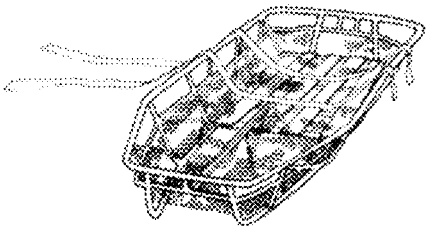
Fig. 1B-3 (Prior Art)
Figures 1, 1B, 2, 3, 4:
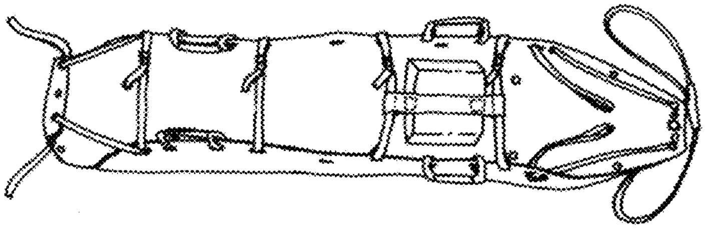
Fig. 1B-4 (Prior Art)
Figures 1, 1B, 2, 3, 4, 5:
Fig. 1B-5 (Prior Art)
Figures 1, 1B, 2, 3, 4, 5, 6:
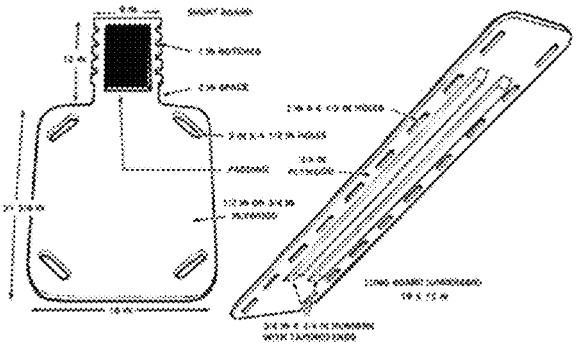
Fig. 1B-6 (Prior Art)
Figure 2A:
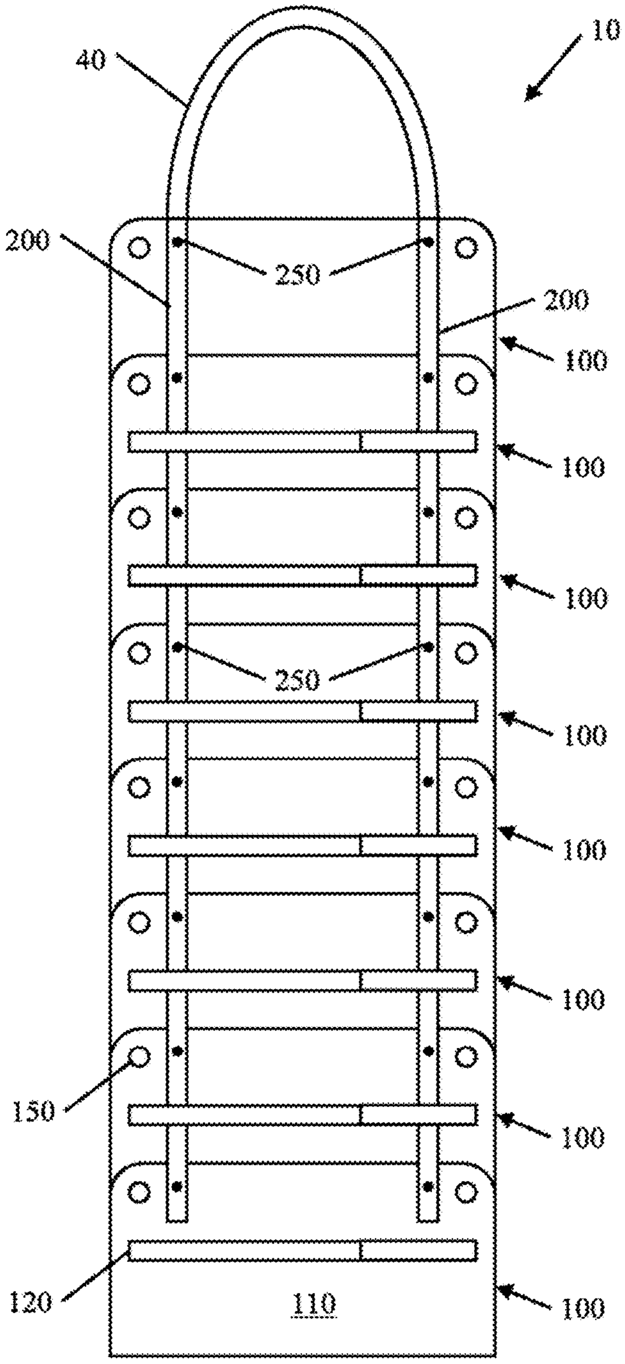
FIG. 2A is a plan view of a sectional litter of the present invention, the sectional litter being configured for pulling.
Figure 2B:
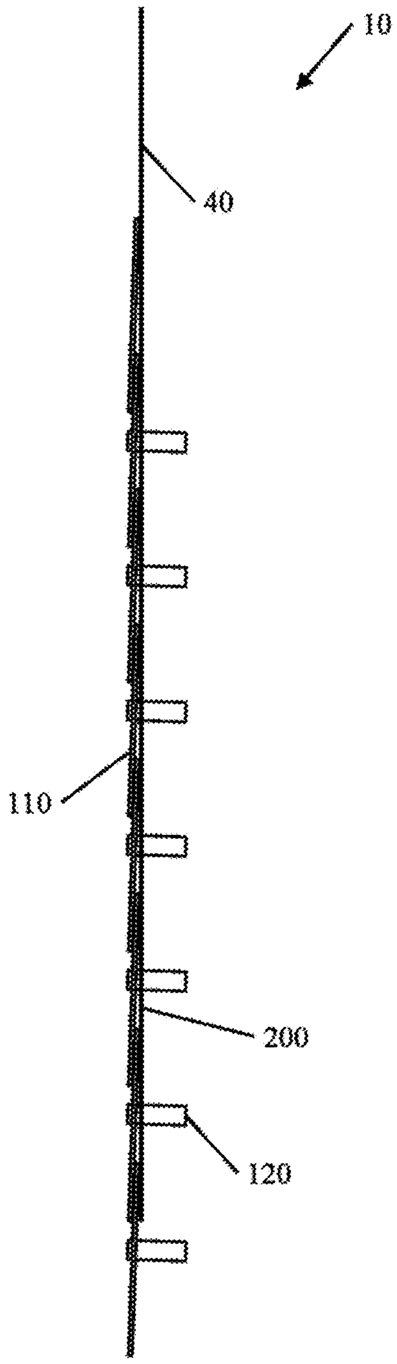
FIG. 2B is a side view of the sectional litter of FIG. 2A.

Referring to FIGS. 2A and 2B, sectional litters 10 of the present invention include a plurality of plate sections 100, each plate section 100 including a plate 110. At least some plate sections 100 including lateral strap 120, each lateral strap 120 being moveable between an open configuration and a closed configuration. In the open configuration, the lateral straps 120 facilitate movement of a patient onto or off of the litter. In the closed configuration, each lateral strap is capable of retaining a respective plate section 100 to a patient, thereby facilitating securement of the patient to the litter.

Each plate section 100 is secured to a longitudinal strap 200, such as with a fastener 250 or the like, thereby linking the plate sections 100 together to form a main body. Other than the forward most plate, which may be referred to as a head plate, each plate of the main body is a trailing plate. Each plate positioned directly in front of a trailing plate is a leading plate for such trailing plate. In some embodiments, the sectional litter 10 includes left and right longitudinal straps 200, each longitudinal strap 200 being secured to the plates near respective left and right sides of each plate 110. In some embodiments, a pull strap 40 is used to facilitate pulling the litter along the ground. In some such embodiments, the pull strap 40 and the left and right longitudinal straps 200 are all formed from the same continuous strap. In other such embodiments, the pull strap 40 is configured to selectively couple to a front end of litter, such as to loops or other attachment mechanisms. In some embodiments, one or more loops are formed by the longitudinal straps.

The main body is configured to facilitate pulling the litter 10 along the ground. For instance, each fastener 250 is positioned at or near a front end of a respective plate 110, thereby eliminating or otherwise reducing the risk of plate buckling when pulling the litter. Furthermore, the length of each plate 110 is greater than the spacing of fasteners 250 along the length of the longitudinal straps 200, thereby causing each trailing plate to overlap slightly with its respective leading plate. More specifically, a front edge of each trailing plate sits atop a rear portion of the respective leading plate, thereby preventing or otherwise inhibiting the front edge of the trailing plate from digging in when the litter 10 is pulled along the ground. In some embodiments, fasteners 250 through each trailing plate are positioned in the overlap region such that a respective leading plate protects the fastener from contact with the ground, thereby improving longevity of the litter.

Figure 2C:
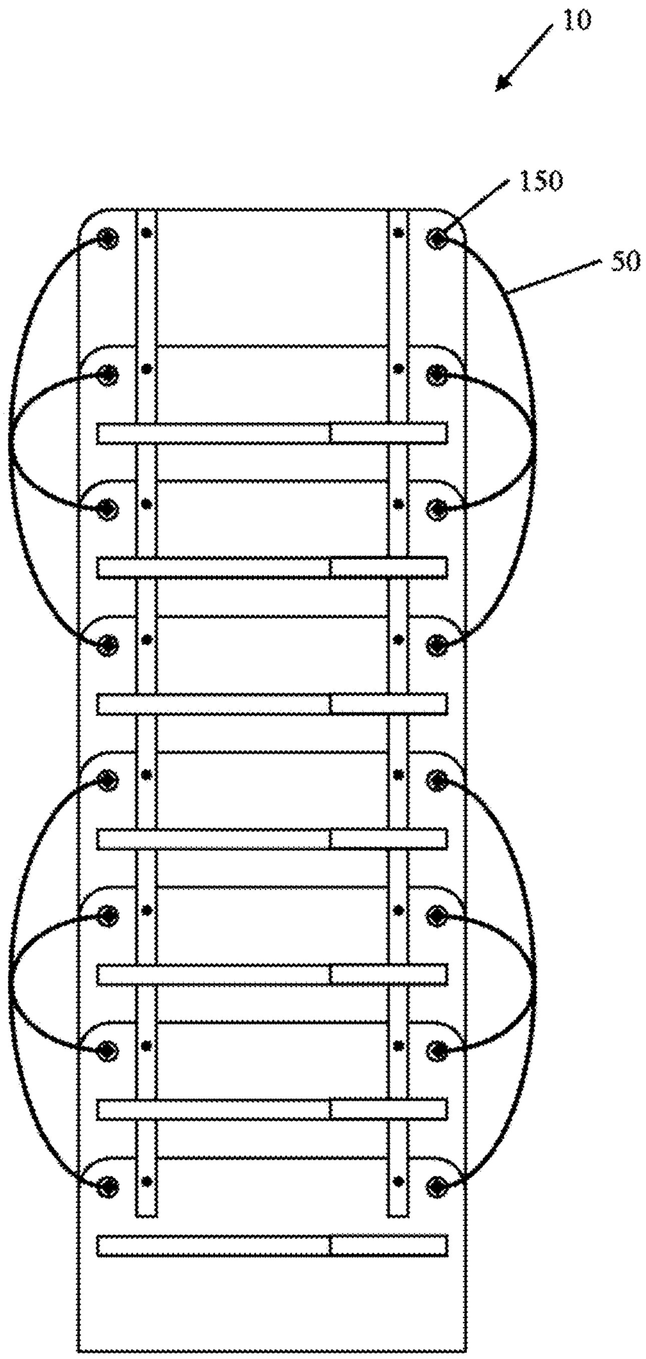
FIG. 2C is a plan view of a sectional litter of the present invention, the sectional litter being configured for lifting.
Figure 2D:
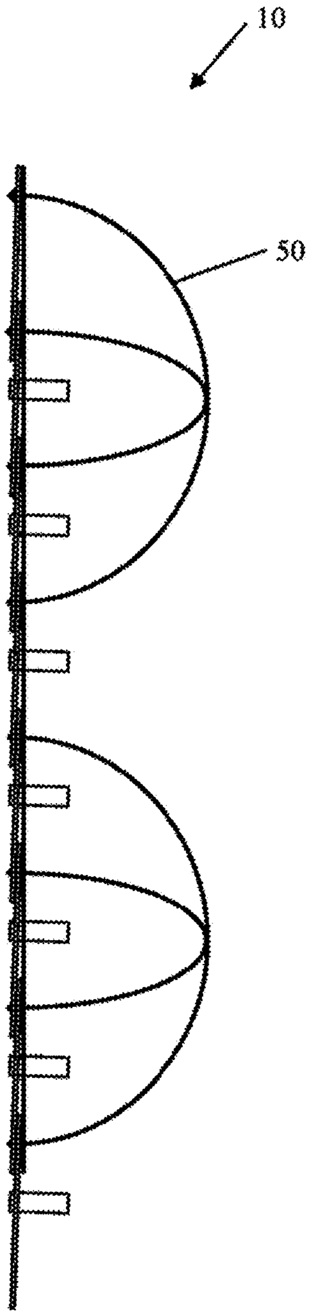
FIG. 2D is a side view of the sectional litter of FIG. 2C.
Figure 3B:
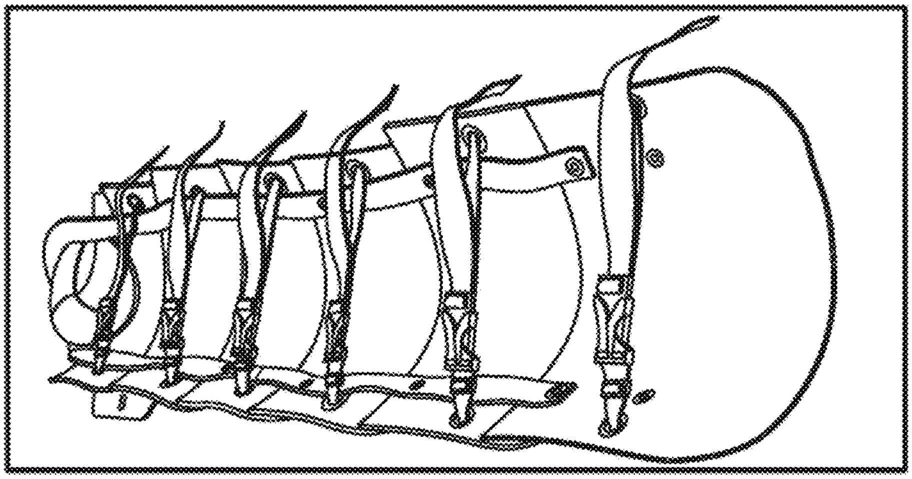
FIG. 3A thru FIG. 3D are images showing a variety of strap configurations for a first prototype sectional litter of the present invention. More specifically.
Figure 3A:
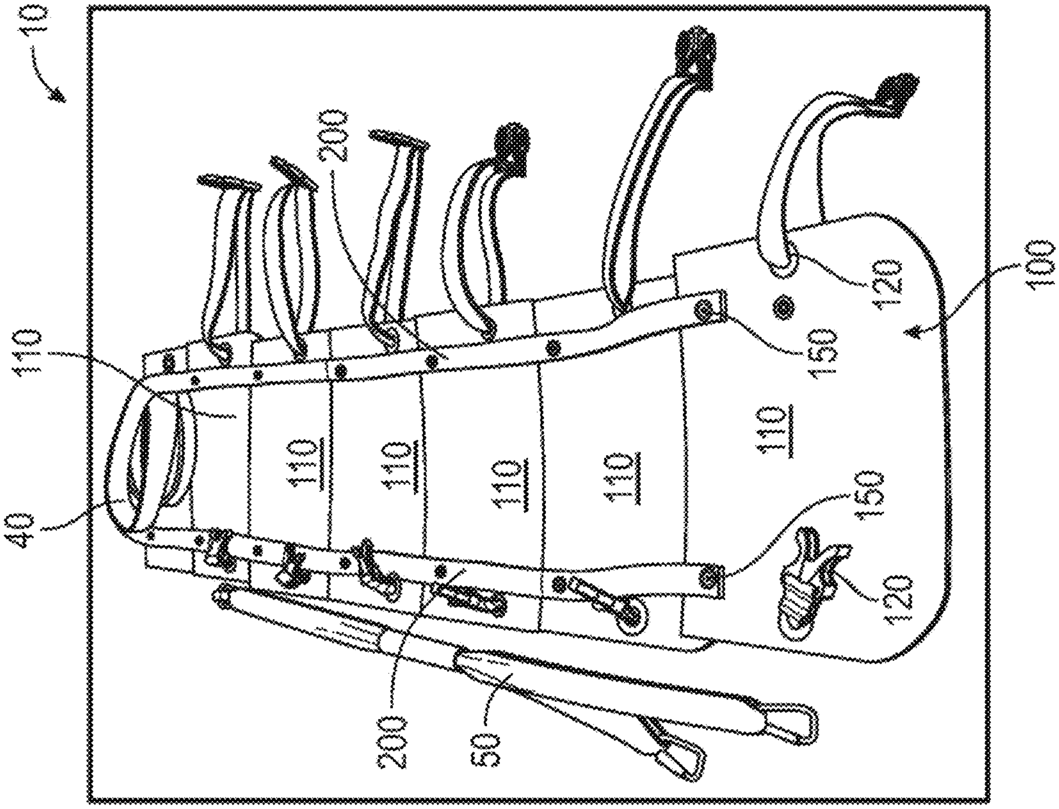
Figure 3D:
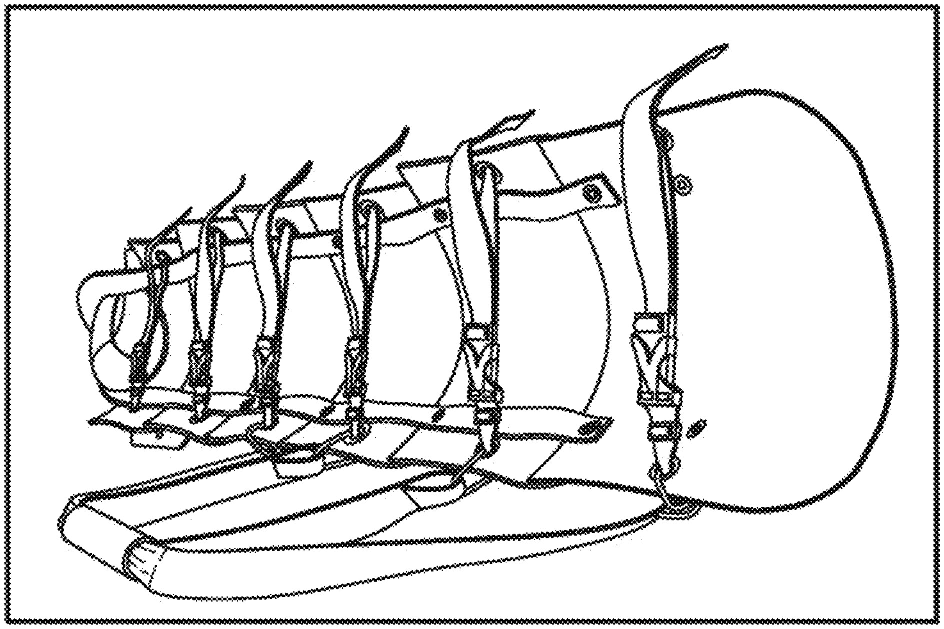
Figure 3C:
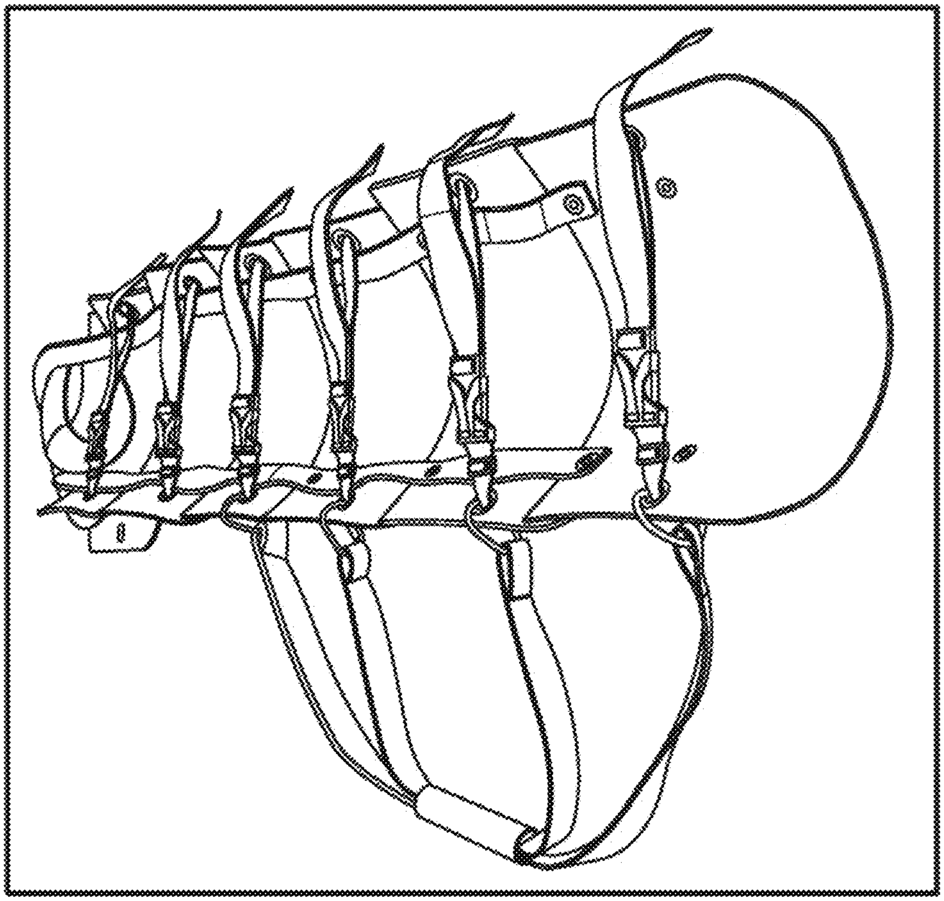
Figure 4A:
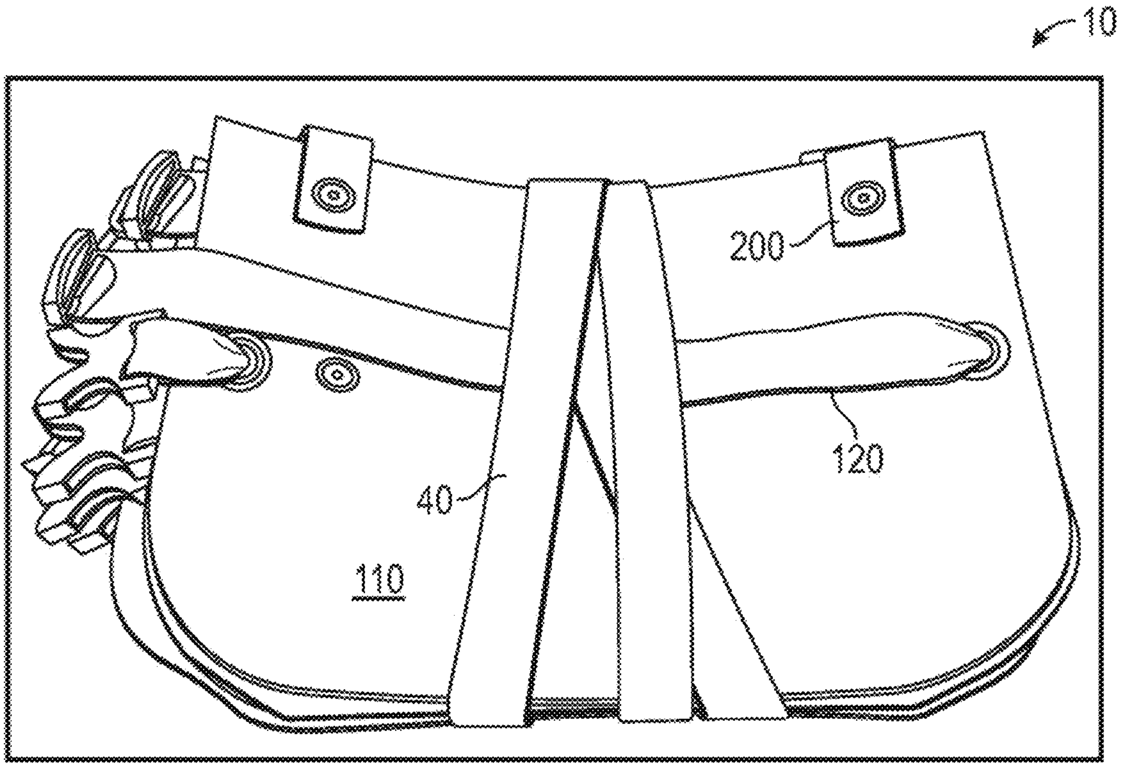
FIGS. 4A and 4B are images of the first prototype sectional litter of FIG. 3A shown in a stowable configuration.
Figure 4B:
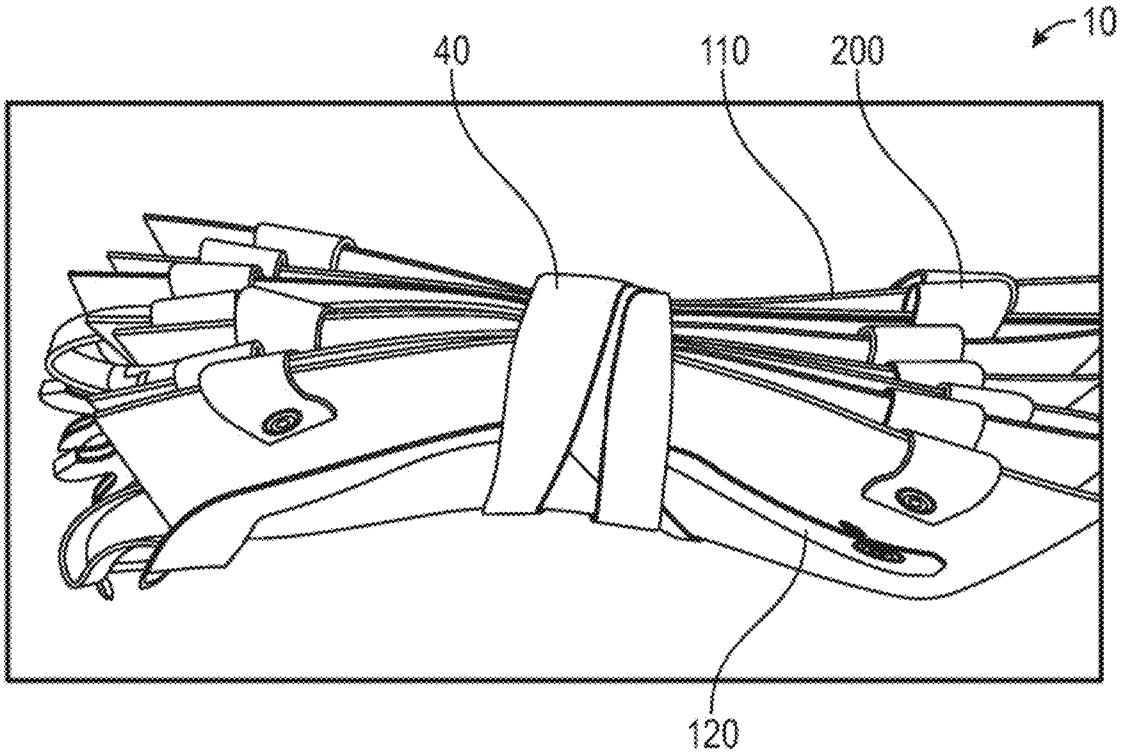
Figure 5C:
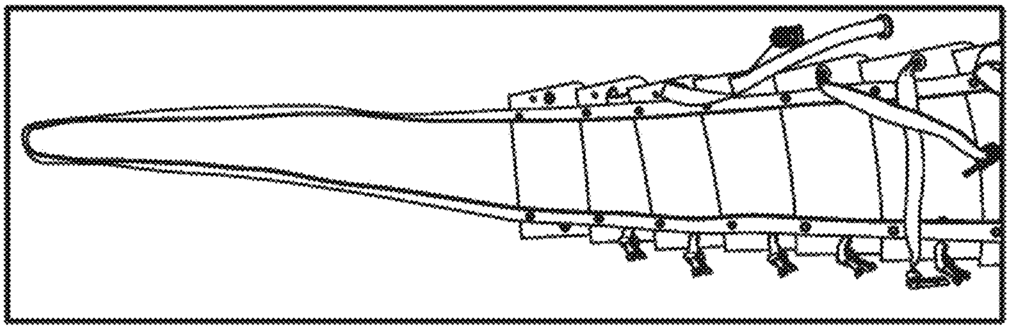
FIGS. 5A thru 5C are images showing the process of moving the first prototype sectional litter of FIG. 3A from the stowable configuration to a deployed configuration. More specifically.
Figure 5B:
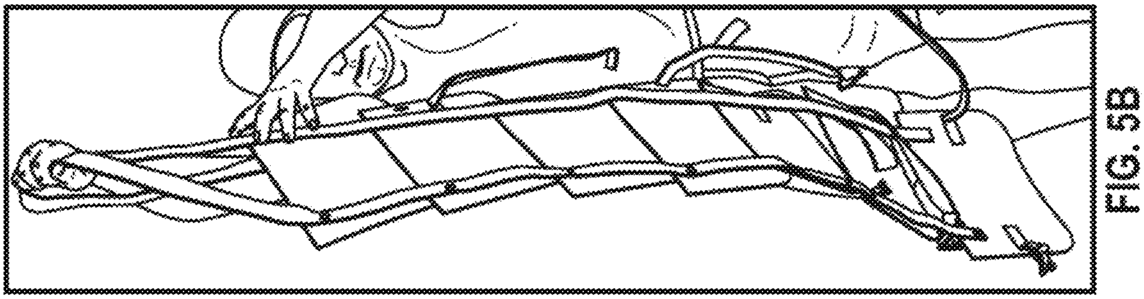
Figure 5A:
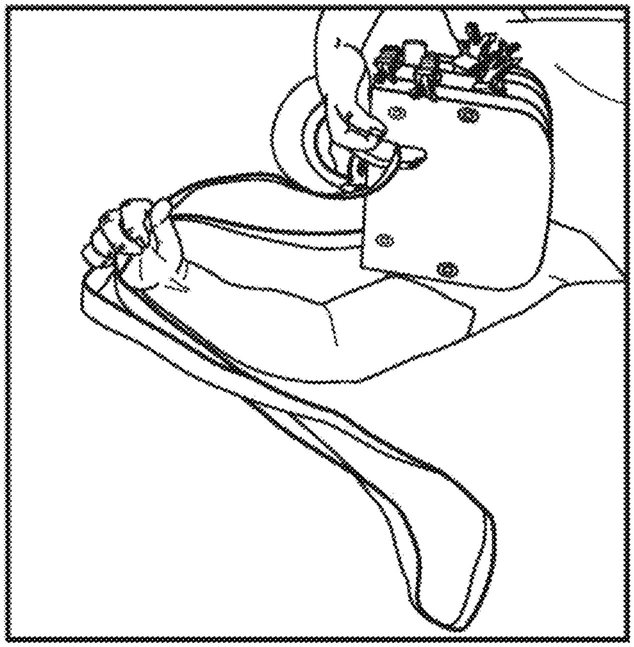
Figure 6A:
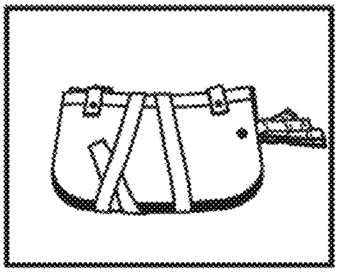
FIGS. 6A thru 6E are images showing various configurations of a second prototype sectional litter of the present invention. More specifically.
Figure 6B:
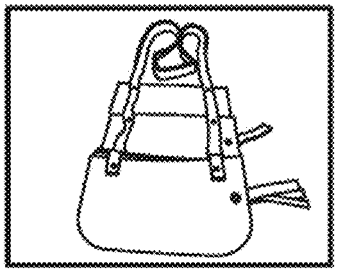
Figure 6C:
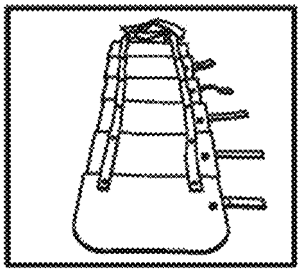
Figure 6D:
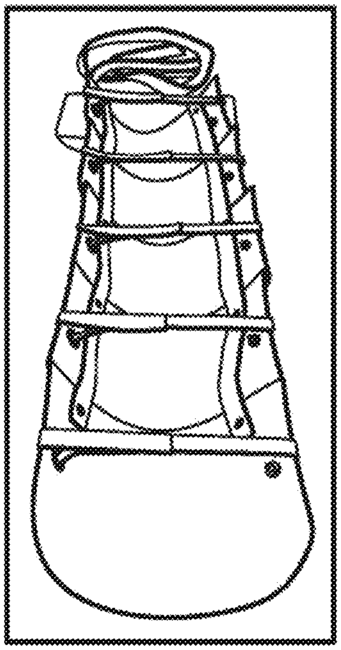
Figure 6E:
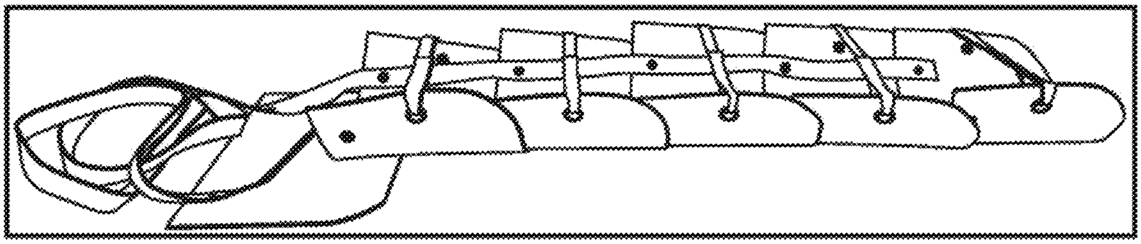

Referring to FIGS. 2C and 2D, some embodiments of the present invention utilize a lift strap assembly 50. In some such embodiments, the lift strap assembly 50 is moveable between a disengaged configuration and an engaged configuration, thereby facilitating storage of the main body of the litter separate from the lift strap assembly. In other embodiments, the lift strap assembly is integral with the main body, thereby facilitating storage of the main body of the litter with the lift strap assembly. In some embodiments, the lift strap assembly includes four handle assemblies, each handle assembly having respective inner and outer handle straps engaged with the main body of the litter. In some embodiments, at least some plates 110 define lift apertures 150 for selective (or integrated) engagement with a handle strap. In some such embodiments, forward lifting apertures of a trailing plate are configured to align with aft lifting apertures of a corresponding leading plate to facilitate simultaneous engagement of each (with a handle strap or other engagement feature), thereby effectively locking the plates relative to each other when lifting the litter. By locking each plate relative to each adjacent plate, a semi-rigid litter is formed.

Figure 7A:
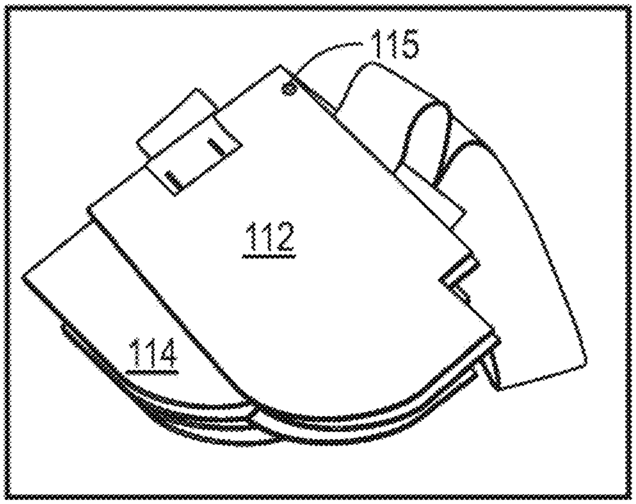
FIGS. 7A thru 7C are images showing various configurations of a third prototype sectional litter of the present invention. More specifically.
Figure 7B:
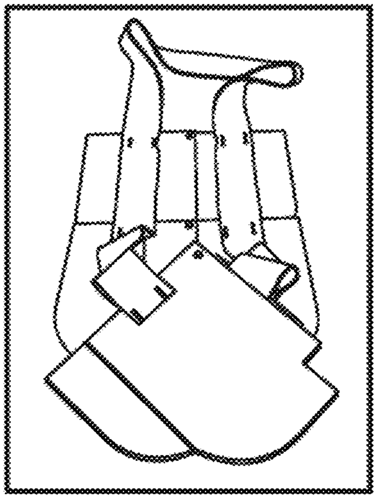
Figure 7C:
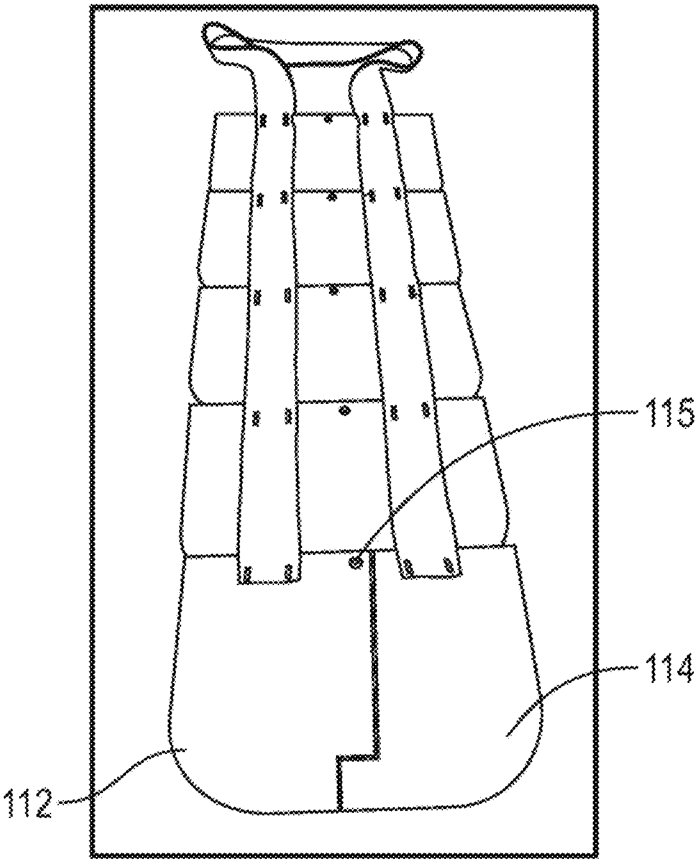
Figure 8A:
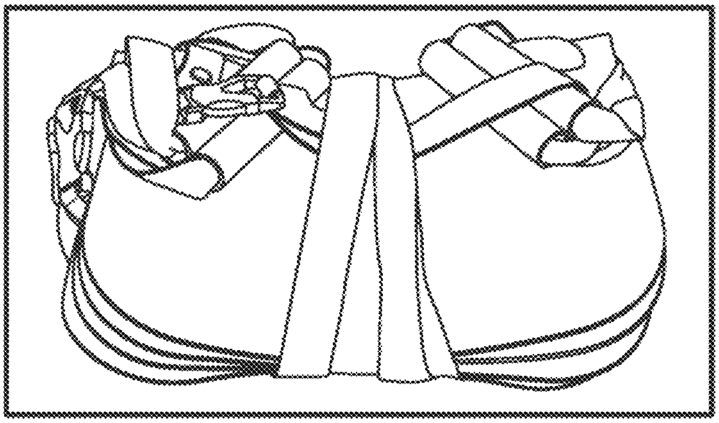
FIGS. 8A thru 8E are images showing various configurations of a fourth prototype sectional litter of the present invention. More specifically.
Figure 8B:
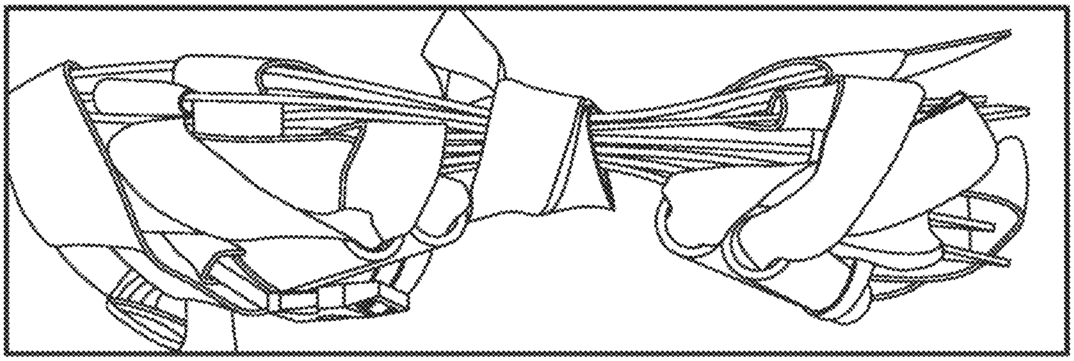
Figure 8C:
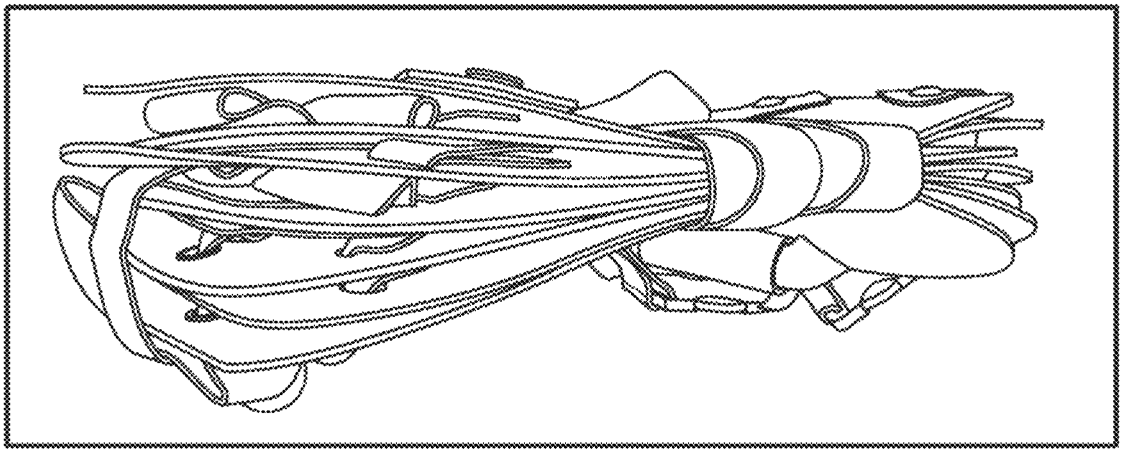
Figure 8D:
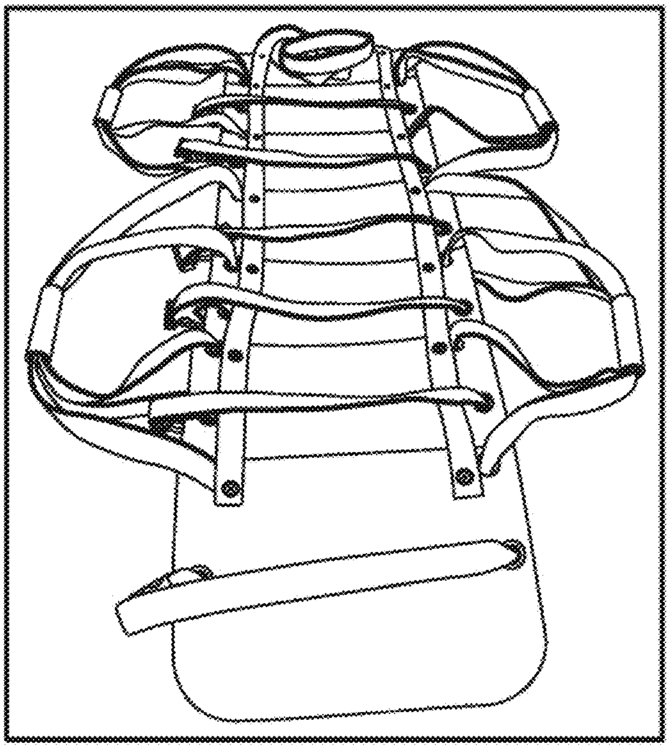
Figure 8E:
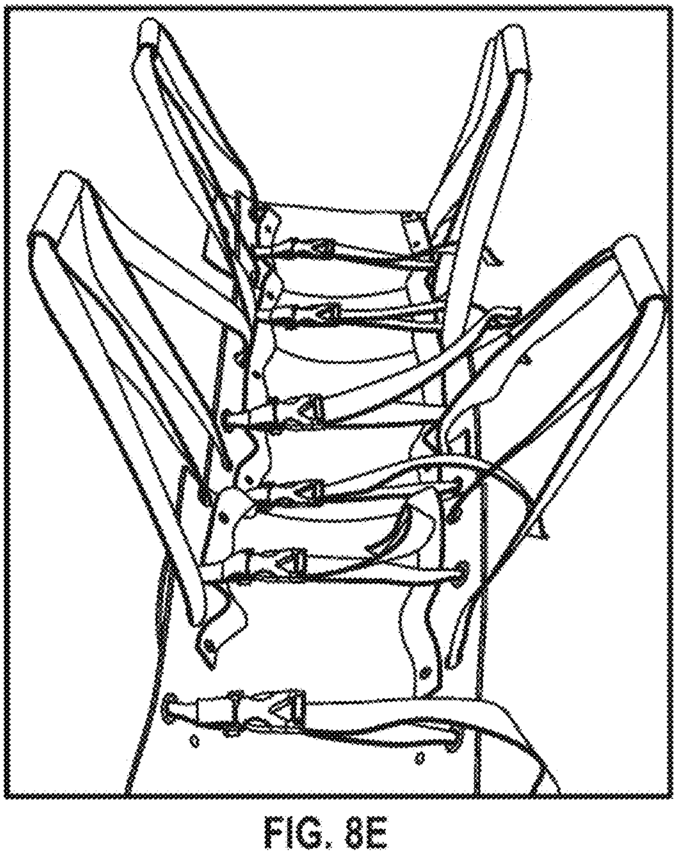

Referring to FIGS. 7A thru 7C, some plates 110 of the present invention are divided into two or more segments, such as first 112 and second 114 segments. In some such embodiments, the first 112 and second 114 segments are secured together with a single pin 115 so that the segments are capable of rotating relative to each other, thereby enabling the plate to rotate between expanded and retracted configurations. In the expanded configuration, a plate is configured to facilitate use of the litter. In the retracted configuration, the plate is configured to facilitate storage of the litter. In some embodiments, the pin 115 is positioned towards the front of the plate such that forces moving the litter from a stowable configuration towards a deployed configuration simultaneously move the plate from a retracted configuration towards an expanded configuration. In some embodiments, one or more plate is divided into three or more pieces.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts, and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A sectional litter comprising a main body, the main body comprising:

a plurality of plate sections, each plate section comprising a plate; and a longitudinal strap coupled to each plate of the plurality of plate sections at a respective connection point, thereby coupling each plate section to each of the other plate sections at respective coupling points, wherein the main body is moveable between stacked and extended configurations, thereby moving the sectional litter between stowable and deployed configurations, respectively, wherein each plate of the plurality of plate sections is stacked with each of the other plates of the plurality of plate sections when the main body is in the stacked configuration, thereby forming a stack of plates, and wherein each plate of the plurality of plate sections extends beyond an adjacent plate of an adjacent plate section when the main body is in the extended configuration, thereby forming an elongated chain of plates.

2. The sectional litter of claim 1, wherein the plurality of plate sections comprise a head plate section, an end plate section, and a plurality of intermediate plate sections positioned therebetween, respective plates of the head, end, and intermediate plate sections being head, end, and intermediate plates.

3. The sectional litter of claim 2, wherein said head plate is a leading plate of said chain of plates, wherein said end plate is a trailing plate of said chain of plates, wherein each intermediate plate is a leading plate and a trailing plate of said chain of plates, and wherein each trailing plate of said chain of plates overlaps a respective leading plate such that a front edge of each trailing plate sits atop a rear portion of its respective leading plate.

4. The sectional litter of claim 3, wherein each trailing plate comprises an overlap section extending from its front edge to a rear edge of its corresponding leading plate, and wherein said coupling point of each trailing plate is positioned in the respective overlap section of each trailing plate.

5. The sectional litter of claim 4, wherein moving the main body from its extended configuration to its stacked configuration comprises moving each front edge of each trailing plate into general alignment with a front edge of a corresponding leading plate such that each front edge of each trailing plate is displaced from each corresponding rear portion of its respective leading plate.

6. The sectional litter of claim 4, wherein each plate comprises first and second segments hingedly coupled together about a respective axis of segment rotation of a respective plate section such that each plate is moveable between expanded and retracted configurations.

7. The sectional litter of claim 6, wherein each plate section of the plurality of plate sections comprises a pin extending along a respective axis of segment rotation, each pin being coupled to respective first and second segments of its respective plate so as to facilitate movement of such plate between expanded and retracted configurations.

8. The sectional litter of claim 7, wherein said front edge of each trailing plate extends along respective first and second segments such that said front edge of each trailing plate is segmented into first and second edge portions, wherein said first and second edge portions are colinear when their respective trailing plate is in its expanded configuration, and wherein said first and second edge portions are perpendicular to each other when their respective trailing plate is in its retracted configuration.

9. The sectional litter of claim 8, wherein moving the main body from its extended configuration to its stacked configuration comprises moving each plate from its expanded configuration to its retracted configuration.

10. The sectional litter of claim 9, wherein moving the main body from its extended configuration to its stacked configuration comprises moving each front edge of each trailing plate into general alignment with a front edge of a corresponding leading plate such that each front edge of each trailing plate is displaced from each corresponding rear portion of its respective leading plate.

11. The sectional litter of claim 10, wherein each axis of segment rotation of each plate section is aligned with each axis of segment rotation of each of the other plate sections when the main body is in its stacked configuration.

12. The sectional litter of claim 11, wherein the longitudinal strap is a first longitudinal strap extending along a first side of the main body, the sectional litter further comprising a second longitudinal strap extending along a second side of the main body, the first and second straps being coupled to respective first and second segments of each plate of the chain of plates.

13. The sectional litter of claim 12, further comprising a pull strap extending forward of the main body when the sectional litter is in the deployed configuration.

14. The sectional litter of claim 12, further comprising a lift strap assembly comprising a plurality of handle straps, each handle strap having opposed ends, wherein each end of each handle strap extends through a lift aperture of the chain of plates, and wherein each lift aperture of the chain of plates extends through a respective front portion of a respective trailing plate and a respective rear portion of a respective leading plate.

15. The sectional litter of claim 12, wherein a first quantity of the plurality of plate sections further comprises a lateral strap, each lateral strap being moveable between an open configuration and a closed configuration.

16. A method of using a sectional litter, the method comprising:

moving a main body of the sectional litter from a stowable configuration to a deployed configuration, thereby forming a chain of plates having a head plate, an end plate, and a plurality of intermediate plates positioned therebetween;

positioning a patient on the chain of plates;

securing the patient to the chain of plates; and moving the litter while the patient is secured to the chain of plates, wherein the main body comprises:

a plurality of plate sections, each plate section comprising a plate of the chain of plates; and a longitudinal strap coupled to each plate of the plurality of plate sections at a respective connection point, thereby coupling each plate section to each of the other plate sections at a coupling point, wherein the main body is moveable between stacked and extended configurations associated with the stowable and deployed configurations, respectively, of the sectional litter, wherein each plate of the plurality of plate sections is stacked with each of the other plates of the plurality of plate sections when the main body is in the stacked configuration, thereby forming a stack of plates, and wherein each plate of the plurality of plate sections extends beyond an adjacent plate of an adjacent plate section when the main body is in the extended configuration, thereby forming the elongated chain of plates.

17. The method of claim 16, wherein:

said head plate is a leading plate of said chain of plates;

said end plate is a trailing plate of said chain of plates;

each intermediate plate is a leading plate and a trailing plate of said chain of plates;

each trailing plate of said chain of plates overlaps a respective leading plate such that a front edge of each trailing plate sits atop a rear portion of its respective leading plate;

each trailing plate comprises an overlap section extending from its front edge to a rear edge of its corresponding leading plate.

18. The method of claim 17, wherein moving the main body from its extended configuration to its stacked configuration comprises moving each front edge of each trailing plate into general alignment with a front edge of a corresponding leading plate such that each front edge of each trailing plate is displaced from each corresponding rear portion of its respective leading plate.

19. The method of claim 18, further comprising rotating first and second segments of each plate about a respective axis of segment rotation of a respective plate section such that each plate moves from a retracted configuration to an expanded configuration.

20. The sectional litter of claim 19, wherein:

positioning the patient to the chain of plates comprises moving a lateral strap of a plate section of the plurality of plate sections to an open configuration;

securing the patient to the chain of plates comprises moving the lateral strap to a closed configuration; and moving the patient comprises utilizing one of:

a pull strap extending forward from the main body; and a handle assembly comprising a plurality of handle straps, each handle strap having opposed ends, wherein each end of each handle strap extends through a lift aperture of the chain of plates, and wherein each lift aperture of the chain of plates extends through a respective front portion of a respective trailing plate and a respective rear portion of a respective leading plate.

* * * * *